US011165771B2

(12) United States Patent
Zavesky et al.

(10) Patent No.: US 11,165,771 B2
(45) Date of Patent: Nov. 2, 2021

(54) PROXIMITY BASED DATA ACCESS RESTRICTIONS

(71) Applicant: AT&T Intellectual Property I, L.P., Atlanta, GA (US)

(72) Inventors: Eric Zavesky, Austin, TX (US); David Crawford Gibbon, Lincroft, NJ (US); Zhu Liu, Marlboro, NJ (US); Paul Triantafyllou, Watchung, NJ (US); Bernard S. Renger, New Providence, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 294 days.

(21) Appl. No.: 15/818,343

(22) Filed: Nov. 20, 2017

(65) Prior Publication Data
US 2019/0158492 A1 May 23, 2019

(51) Int. Cl.
*H04L 29/06* (2006.01)
*G06F 21/62* (2013.01)
(Continued)

(52) U.S. Cl.
CPC ........ *H04L 63/0861* (2013.01); *G06F 16/951* (2019.01); *G06F 21/604* (2013.01); *G06F 21/62* (2013.01); *H04L 63/107* (2013.01)

(58) Field of Classification Search
CPC . H04L 63/0861; H04L 63/107; H04L 63/102; H04L 63/105; H04L 63/08;
(Continued)

(56) References Cited

U.S. PATENT DOCUMENTS 7,756,988 B2   7/2010  Macdonald et al.
8,087,068 B1   12/2011 Downey et al.
(Continued)

FOREIGN PATENT DOCUMENTS

WO   2016126690 A1   8/2016
WO   2017141065 A1   8/2017

OTHER PUBLICATIONS

Lang, "Access Control in 2016—What you Need to Know", The State of Security, tripwire.com, Feb. 24, 2016. 4 Pages. https://www.tripwire.com/state-of-security/featured/access-control-in-2016-whatyou-need-to-know/.
(Continued)

*Primary Examiner* — Kevin Bechtel
*Assistant Examiner* — Sangseok Park

(57) ABSTRACT

An example method may include a processing system including at least one processor detecting an interaction of a first user and a second user, providing a temporary authorization to the second user to access a data set based upon an authorization of the first user to access the data set, wherein the providing the temporary authorization is in response to the detecting the interaction, generating a record of an access of the second user to the data set, wherein the record includes a notation of the temporary authorization of the second user to access the data set based upon the authorization of the first user, detecting an end to the interaction of the first user and the second user, and revoking the temporary authorization of the second user to access the data set in response to the detecting of the end of the interaction.

20 Claims, 4 Drawing Sheets

(51) Int. Cl.
*G06F 16/951* (2019.01)
*G06F 21/60* (2013.01)

(58) Field of Classification Search
CPC ....... H04L 63/04; G06F 16/951; G06F 21/62; G06F 21/10; G06F 21/604; G06F 21/31; G06F 2221/2103; G06F 2221/2141; G06F 2221/2115; G06F 1/3231; G06Q 10/105; G16H 40/67; H04W 12/02; H04W 4/08; H04W 8/22

See application file for complete search history.

(56) References Cited

U.S. PATENT DOCUMENTS

| | | | |
|---|---|---|---|
| 8,464,161 B2 | 6/2013 | Giles et al. | |
| 8,494,576 B1 | 7/2013 | Bye et al. | |
| 8,595,810 B1 | 11/2013 | Ben | |
| 8,644,506 B2 | 2/2014 | Zellner | |
| 8,752,149 B2 | 6/2014 | Emura et al. | |
| 8,763,140 B2 | 6/2014 | Marcus et al. | |
| 8,910,309 B2 | 12/2014 | Harrison et al. | |
| 8,914,859 B2 | 12/2014 | Erickson et al. | |
| 9,009,794 B2 * | 4/2015 | Dykeman | G06F 21/10 726/4 |
| 9,129,133 B2 | 9/2015 | Lafever et al. | |
| 9,251,360 B2 | 2/2016 | Meyer et al. | |
| 9,361,481 B2 | 6/2016 | Lafever et al. | |
| 9,489,538 B2 | 11/2016 | Vyas et al. | |
| 9,589,127 B2 | 3/2017 | Copsey | |
| 9,590,989 B2 | 3/2017 | Spagnola | |
| 9,619,669 B2 | 4/2017 | Lafever et al. | |
| 9,646,143 B2 | 5/2017 | Lavinio | |
| 2009/0287928 A1 | 11/2009 | Braun | |
| 2010/0205667 A1 * | 8/2010 | Anderson | G06F 3/013 726/19 |
| 2011/0277012 A1 | 11/2011 | Carter et al. | |
| 2013/0129075 A1 * | 5/2013 | Whitaker | H04M 3/523 379/265.09 |
| 2013/0268767 A1 * | 10/2013 | Schrecker | G06F 21/31 713/185 |
| 2013/0316687 A1 * | 11/2013 | Subbaramoo | H04M 1/605 455/418 |
| 2014/0259129 A1 * | 9/2014 | Copsey | G06F 21/40 726/5 |
| 2015/0154417 A1 * | 6/2015 | Pasumarthi | G06F 21/6218 726/30 |
| 2015/0227754 A1 * | 8/2015 | Boss | G06F 21/6218 707/785 |
| 2016/0112871 A1 * | 4/2016 | White | H04W 12/06 726/4 |
| 2016/0203502 A1 * | 7/2016 | Boinodiris | G06Q 30/0205 705/7.34 |
| 2016/0321456 A1 | 11/2016 | Schuman | |
| 2016/0381110 A1 * | 12/2016 | Barnett | H04L 65/601 709/231 |
| 2017/0041296 A1 * | 2/2017 | Ford | G06F 16/951 |
| 2017/0070480 A1 | 3/2017 | Blumenfeld et al. | |
| 2017/0091466 A1 | 3/2017 | Meyer et al. | |
| 2017/0126681 A1 | 5/2017 | Barrett et al. | |
| 2018/0097841 A1 * | 4/2018 | Stolarz | H04L 67/306 |
| 2018/0211005 A1 * | 7/2018 | Allen | G16H 10/60 |
| 2018/0324186 A1 * | 11/2018 | Dintenfass | H04L 63/04 |
| 2019/0036707 A1 * | 1/2019 | Eliezer | H04L 9/3247 |
| 2019/0130358 A1 * | 5/2019 | Sugaya | G16H 80/00 |

OTHER PUBLICATIONS

Zhou et al., "Continuous privacy preserving publishing of data streams", Proceedings of the 12th International Conference on Extending Database Technology: Advances in Database Technology. ACM, 2009. 12 Pages. https://pdfs.semanticscholar.org/0411/303ec23ce7bf31fccac2df137ea46e8b153d.pdf.

* cited by examiner

PROXIMITY BASED DATA ACCESS RESTRICTIONS

The present disclosure relates generally to electronic data access procedures, and more specifically to methods, computer-readable media, and devices for providing, in response to detecting an interaction of a first user and a second user, a temporary authorization to the second user to access a data set based upon an authorization of the first user to access the data set, and to methods, computer-readable media, and devices for altering restricted data from a data set when it is detected that a user authorized to access the data set is requesting to view data from the data set at an insecure location.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
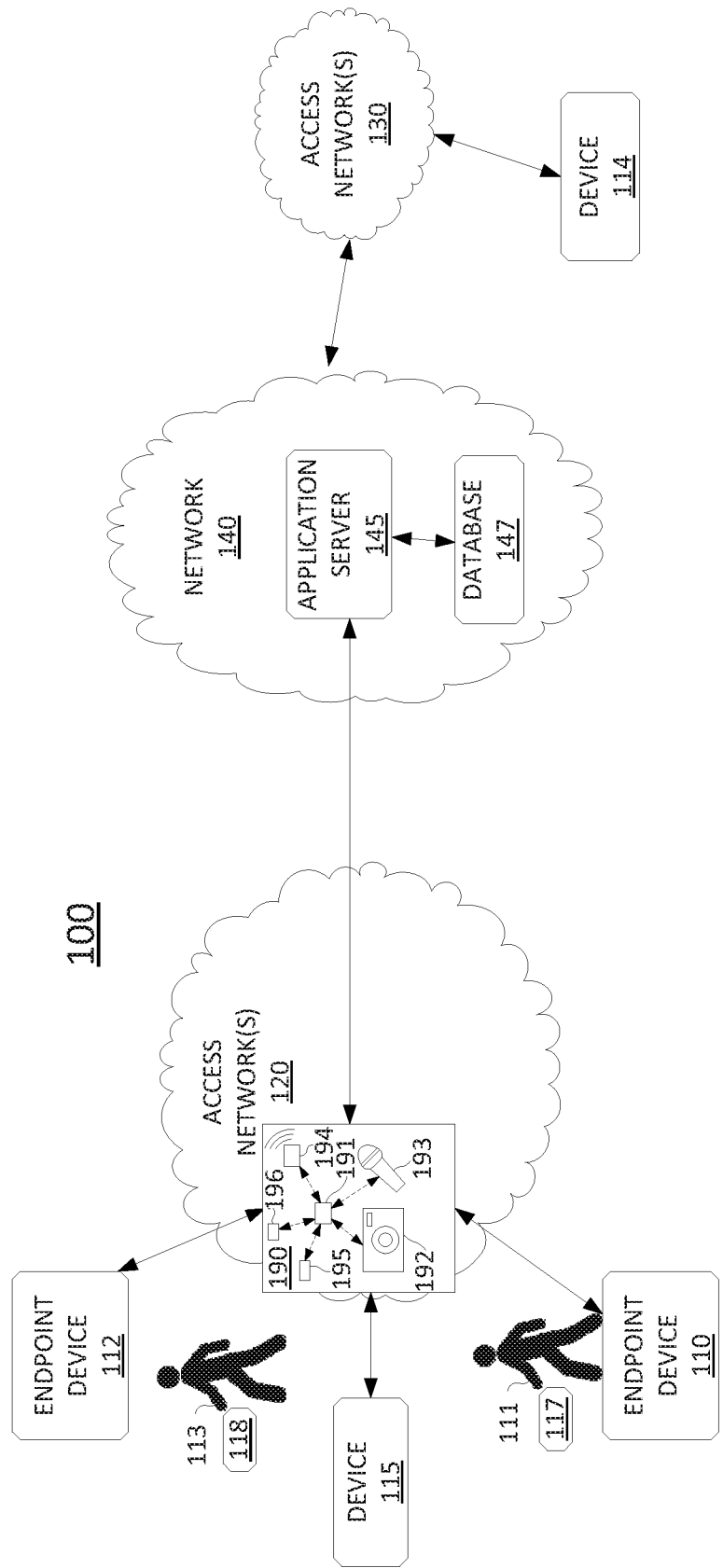
FIG. 1 illustrates an example system related to the present disclosure.

In one example, the present disclosure discloses a method, computer-readable medium, and device for providing, in response to detecting an interaction of a first user and a second user, a temporary authorization to the second user to access a data set based upon an authorization of the first user to access the data set. For example, a method may include a processing system including at least one processor detecting an interaction of a first user and a second user, providing a temporary authorization to the second user to access a data set based upon an authorization of the first user to access the data set, wherein the providing the temporary authorization is in response to the detecting the interaction, generating a record of an access of the second user to the data set, wherein the record includes a notation of the temporary authorization of the second user to access the data set based upon the authorization of the first user, detecting an end to the interaction of the first user and the second user, and revoking the temporary authorization of the second user to access the data set in response to the detecting of the end of the interaction.

In another example, the present disclosure discloses a method, computer-readable medium, and device for altering restricted data from a data set when it is detected that a user authorized to access the data set is requesting to view data from the data set at an insecure location. For example, a method may include a processing system including at least one processor detecting that a user authorized to access a data set is in an insecure location, receiving a request from a device of the user at the insecure location to view data from the data set, determining that the data from the data set contains restricted data, altering the restricted data from the data set, and providing the data from the data set with the restricted data that is altered to the user.

Data scientists and analysts often participate in live demonstrations or presentations. However, data access privileges and data anonymization policies may stand in the way of an easy-to-use task demonstration. For example, helping a new staff member learn a dataset or algorithm, or giving a presentation to a larger group can be arduous when it is desired to use a protected data set in the demonstration or presentation. An illustrative scenario may be as follows. User A is a supervisor and user B is a new employee. User B may not have access to data set M or task X. However, user A may come to user B's terminal and instruct user B to execute task X on data set M. User B may attempt to execute task X on data set M at the instruction of user A. Unfortunately, User B is not authorized to access to perform task X on data set M. However, the present disclosure may detect the interaction of user A and user B. The present disclosure may also determine that user A is authorized to perform task X on data set M. As such, the present disclosure may provide a temporary authorization to user B based upon the privileges/authorization level of user A.

To illustrate, in one example, the present disclosure detects an interaction of a first user and a second user. The interaction may be a live interaction between the users at a location. For instance, in one example, the present disclosure uses biometric sensors and/or wireless sensors to determine the proximity and interaction of two users. For example, detection of a personal device, such as a mobile phone, an identification tag, or another identification device may be used to determine a user's location. Biometric techniques such as facial, gait, iris, fingerprint or voice recognition may also be employed at particular locations to detect the presence of the two users. In one example, both detection of a personal device and biometric verification may be required to confirm a location of a user. The interaction of the two users may also be verified in a variety of ways to distinguish between a true interaction, and the two users merely being nearby to one another, e.g., simply standing or sitting near each other without having any interactions. For instance, the visual focus of a user's eyes, the body orientation of the user, the user's heart rate, and other factors may be individually measured and correlated with measurements from the other user to determine that the two users are actively engaged in an interaction. Alternatively, or in addition, a notification may be sent to a mobile phone or other devices of the authorized user to confirm or deny whether the two users are engaged in an interaction and that the other user should be granted temporary access/authorization.

In another example, an interaction of the first user and the second user may comprise an electronic communication session between devices associated with the first user and the second user. For example, the first user and the second user may be engaged in a telephone call, a screen-sharing session, a video call, or the like. In such case, a temporary authorization may also be granted to the unauthorized user based upon the authorization of the other user who is participating in the session.

In one example, a temporary authorization can be recorded and maintained with an expiration time. In addition, in one example, a temporary authorization can be periodically re-verified with a polling technique. For example, an expiration can be bound to a single task, a predetermined period of time, or an access of a certain type or quantity of data. In one example, continued access can be revoked by detecting that the two users are no longer proximate, e.g., separated by a predefined distance (e.g., separated by a distance greater than 30 feet, 40 feet, 50 feet, and so on). In still another example, temporary access may be revoked by an explicit instruction from the authorized user, e.g., prior to a default expiration time of the temporary authorization that was set when initially granted. In one example, audit logs (e.g., login events, queries/tasks performed, etc.) may record actions with a notation that the actions were "under authorization" of another user. For example, the audit logs may indicate that both users are working together but that one of the users (previously underprivileged user) is the primary actor.

In one example, data alteration may also be applied in conjunction with temporary authorizations. For example, if a query permitted under a temporary authorization in accordance with the present disclosure will result in customer information being displayed on a screen, a preliminary data display policy may be evaluated to determine if some data fields should be altered. For example, a query may return a list of all responsive records. However, the records may include a large number of fields that are not relevant to the query, all or a portion of which may be altered prior to providing and/or displaying the data/records responsive to the query. For instance, examples of data alteration include data hiding (e.g., suppressing values), data anonymization (e.g., replacement with random values), or detail hiding (e.g., replacement with a more generic, non-specific value). Broadly, data alteration may include data suppression (e.g., hiding, redacting, or omitting data), anonymizing, obfuscating, replacing, or substituting data, and so forth.

In one example, graphical data-based visualizations can similarly be modified to limit the detail and granularity of data: instead of knowing the precise location of an action, the location can be blurred or anonymized to be within a larger unknown radius, salaries, ages, and other types of data may be similarly obfuscated or anonymized, pictures may be blurred or replaced with placeholder images, and so forth. In one example, a display or user interface may also be altered to hide certain data. For instance, in a managed organization, settings at a user desktop may impose server-based restrictions, such that an instruction to omit certain fields from a display may be imposed at the user desktop. In one example, data alteration may be applied to restricted data, e.g., data that is deemed sensitive. The data set may include a specific designation of certain data as being "restricted." In another example, data may be determined to be restricted based upon the context of the query, task, or other action. Thus, data alteration may be automatically employed by job task and is context-dependent such that no accidental information leaks occur during normal job tasks.

In another example, a representative scenario may be as follows. A user authorized to access a data set may be accessing the data set in an insecure location, such as within in a crowd, in a public place, or utilizing a potentially insecure display (e.g., a web presentation, a live conference, a screen sharing session or virtual meeting (broadly an "electronic collaboration session"), or the like). For example, a data scientist or other person with access to data may need to give a presentation to board members, marketing personnel, others outside the organization at a conference, etc. The presentation may be a separate document, slide show, etc., or may include a demonstration using a data access system to access, manipulate, or otherwise process the data. It may be tedious and error prone to check over all the data to make sure that there is no proprietary information, personal information of customers, personnel, and others, or the like that is inadvertently revealed in the presentation.

However, in such an example, the present disclosure may employ a combination of data alteration and temporary revocation of access. For instance, when providing data to a device of the user for possible display, location information can be blurred or altered to be within a larger unknown radius, salaries, ages, and other types of data may be similarly altered, names can be abbreviated to initials only, or omitted entirely, and so forth. In one example, a location may be deemed insecure based upon a detection of one or more unknown individuals or based upon a detection of one or more known unauthorized individuals at the location. In another example, a location may be deemed insecure by the nature of the location. For example, the location may be outside of a specific designated room, floor, building, or other areas where access to a data set may be permitted. In another example, a user may be deemed to be in an insecure location when a device of the user is engaged in a screen sharing or remote access session with a device of another user who is unauthorized.

In still another example, the present disclosure provides a collective authorization scheme (e.g., two or more authorized users are required for task M on data set Y). For instance, certain accesses of a data set may require the presence of two or more authorized users, e.g., for certain very sensitive data sets so that there are always two persons who can be attributed with firsthand knowledge of how the data was accessed and/or used. The presence of the two or more users may be at the same location, detected in the same or a similar manner as described above, or may be in an electronic collaboration session as described above. In one example, another user may arrive at the location or join the session, which may cause the collective authorization to be revoked. However, in another example, the collective authorization may be maintained based upon the continued presence of the two or more authorized users. However, in such case, certain data designated as sensitive may be altered prior to providing and/or displaying the data/records on a display at the location or at any displays engaged as part of an electronic collaboration session. These and other aspects of the present disclosure are described in greater detail below in connection with the discussion of FIGS. 1-4.

FIG. 1 is a block diagram depicting one example of a network or communications system 100 related to examples of the present disclosure. The overall communications system 100 may include any number of interconnected networks which may use the same or different communication technologies, such as a traditional circuit switched network (e.g., a public switched telephone network (PSTN)) or a packet network such as an Internet Protocol (IP) network (e.g., an IP Multimedia Subsystem (IMS) network), a multi-protocol label switching (MPLS network), a frame relay network, an asynchronous transfer mode (ATM) network, a wireless network, a cellular network (e.g., 2G, 3G, and the like), a long term evolution (LTE) network, 5G, and so forth. It should be noted that an IP network is broadly defined as a network that uses Internet Protocol to exchange data packets. As illustrated in FIG. 1, system 100 may include a network 140. In one example, the network 140 may be operated by a telecommunications service provider. In one example, network 140 may include a cellular core network, such as an evolved packet core (EPC) network. In one example, network 140 may include an IP Multimedia Subsystem (IMS) network. In one example, network 140 may comprise a converged network of a telecommunications service provider.

In one example, network 140 may include an application server (AS) 145 which may comprise all or a portion of a computing device or system, such as computing system 400, and/or processing system 402 as described in connection with FIG. 4 below, and may be configured to provide one or more functions for providing, in response to detecting an interaction of a first user and a second user, a temporary authorization to the second user to access a data set based upon an authorization of the first user to access the data set and/or for altering restricted data from a data set when it is detected that a user authorized to access the data set is requesting to view data from the data set at an insecure location, as described herein. For instance, AS 145 may perform various operations as described below in connection with either or both of the example methods 200 and 300 of FIGS. 2 and 3, respectively. As illustrated in FIG. 1, AS 145 may also be in communication with a database 147, e.g., a data storage device/server, a cluster of servers for data storage, etc. In accordance with the present disclosure, database 147 may store one or more protected data sets (e.g., data sets requiring an authorization in order for a user to access the data in the data set). For instance, AS 145 may manage access to data sets in database 147 in accordance with the present disclosure.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the network 140, broadly a "communications network," may be in communication with one or more access networks 120 and 130. The access networks 120 and 130 may include a wireless access network (e.g., an IEEE 802.11/Wi-Fi network and the like), a Wide Area Network (WAN), a cellular access network, such as an evolved Universal Terrestrial Radio Access Network (eU-TRAN) that includes one or more eNodeBs, a PSTN access network, a cable access network, a digital subscriber line (DSL) network, a metropolitan area network (MAN), other types of wired access networks, an Internet service provider (ISP) network, and the like. In one embodiment, the access networks 120 and 130 may all be different types of access networks, may all be the same type of access network, or some access networks may be the same type of access network and other may be different types of access networks. The network 140 and the access networks 120 and 130 may be operated by different service providers, the same service provider or a combination thereof. Alternatively, or in addition, access networks 120 and 130 may represent corporate, governmental or educational institution LANs, a home/residential LAN, and the like. The network 140 and the access networks 120 and 130 may be interconnected via one or more intermediary networks (not shown) which may utilize various different protocols and technologies for transporting communications in the form of data packets, datagrams, protocol data units (PDUs), and the like, such as one or more IP/MPLS networks, on or more frame relay networks, one or more ATM networks, and so forth.

In one example, mobile endpoint devices 110 and 112 may each comprise one of: a mobile phone, a smart phone, an email device, a computer tablet, a messaging device, a Personal Digital Assistant (PDA), a Wi-Fi device, a tablet, or the like, or a wearable computing device, such as a head-mounted smart camera, a smart watch, a pair of smart glasses, and so forth. Mobile endpoint devices 110 and 112 may be associated with users 111 and 113, respectively. In one example, mobile endpoint devices 110 and 112 may include components which support peer-to-peer and/or short range wireless communications. Thus, each of the mobile endpoint devices 110 and 112 may include one or more radio frequency (RF) transceivers, e.g., for cellular communications and/or for non-cellular wireless communications, such as for Wi-Fi, Wi-Fi Direct, Bluetooth, and/or Bluetooth Low Energy (BLE) communications, and so forth. In addition, mobile endpoint devices 110 and 112 may be equipped with display screens, speakers, headsets, and the like for displaying and/or presenting communications, and for receiving inputs for interacting with such communications. In one example, devices 114 and 115 may each comprise a mobile endpoint device of a same or a similar nature to mobile endpoint devices 110 and 112. In another example, device 114 and/or device 115 may respectively comprise a desktop computer, a laptop computer, a tablet computer, a smart television, a server, a cluster of such devices, and the like. In one example, mobile endpoint devices 110 and 112, and devices 114 and 115 may each comprise a computing system, such as computing system 400 depicted in FIG. 4, and may be configured to provide one or more functions for providing, in response to detecting an interaction of a first user and a second user, a temporary authorization to the second user to access a data set based upon an authorization of the first user to access the data set and/or for altering restricted data from a data set when it is detected that a user authorized to access the data set is requesting to view data from the data set at an insecure location, as described in connection with the example method 200 of FIG. 2 or method 300 of FIG. 3, and/or as described elsewhere herein.

As illustrated in FIG. 1, users 111 and 113 may also carry identification badges 117 and 118, respectively. Identification badges 117 and 118 may comprise identification cards with barcode or quick response (QR) code identification information, or radio frequency identification (RFID) cards/tags storing identification information. As further illustrated, access network 120 may include a security unit 190. Security unit 190 may include a processing unit 191, which may comprise a computing system, such as computing system 400 depicted in FIG. 4, specifically configured to perform various steps, functions, and/or operations in connection with examples of the present disclosure for providing, in response to detecting an interaction of a first user and a second user, a temporary authorization to the second user to access a data set based upon an authorization of the first user to access the data set and/or for altering restricted data from a data set when it is detected that a user authorized to access the data set is requesting to view data from the data set at an insecure location. Security unit 190 may also include, coupled to the processing unit 191, a camera 192, a microphone 193, a radio frequency identification (RFID) reader 195, and a fingerprint scanner 196. In one example, security unit 190 also includes a wireless transceiver 194, which may comprise an IEEE 802.11/Wi-Fi transceiver (e.g., a wireless router), an IEEE 802.15 based transceiver (e.g., a Bluetooth beacon or a ZigBee access point), an IEEE 802.16 (e.g., wireless metropolitan area network/WiMAX) transceiver, a cellular transceiver, and so forth. In one example, the security unit 190 may be in communication with application server 145 via the wireless transceiver 194 or via a wired connection.

In one example, security unit 190 may obtain biometric information as well as information from mobile endpoint devices and/or identification badges in the vicinity that may be used for authentication purposes. For example, processing unit 191 may obtain an image, images, or video of user 111 and/or user 113 via camera 192. Alternatively, or in addition, processing unit 191 may capture a recording of a voice of user 111 and/or a voice of user 113 via microphone 193. In one example, processing unit 191 may obtain a fingerprint scan of user 111 and/or user 113 via fingerprint scanner 196. Processing unit 191 may then determine an identity of a user via facial recognition, voice recognition, gait recognition, fingerprint matching, and so forth, e.g., by comparing captured images, video, voice recordings, and/or fingerprint scans to stored samples of images, video, fingerprints, and/or voice recording of users 111 and 113 respectively, by using stored eigenfaces, eigenvoices, etc. In one example, processing unit 191 may obtain identification information of user 111 and/or user 113 from identification badge 117 and/or identification badge 118. In one example, the security unit 190 may also communicate with mobile endpoint devices 110 and 112 within a communication range of the wireless transceiver 194. In one example, mobile endpoint devices 110 and 112 communicate with other devices via network 140, access networks 130, etc., through security unit 190. In one example, security unit 190 may determine the presence of user 111 and/or user 113 via the detection of mobile device 110 and/or mobile device 112, which are associated with user 111 and user 113, respectively.

In one example, application server 145 may receive information from security unit 190 regarding the detection of known users, or the detection of one or more individuals who are unknown users. In another example, application server 145 may receive images, video, audio recordings, fingerprint scans, identification tag/badge information, mobile endpoint device detections, etc. captured by security unit 190 and forwarded to application server 145. For instance, application server 145 may then utilize the received images, video, audio recordings, fingerprint scans, mobile endpoint device detections, and so forth to detect known or unknown users via facial recognition, voice recognition, gait recognition, fingerprint matching, and so forth. In any case, application server 145 may make decisions regarding whether to permit or deny access to a data set in database 147 based upon whether a known authorized user is detected, whether an unknown user is detected, and so on, whether to provide a temporary authorization, whether to temporarily revoke an authorization, whether to alter data from the data set prior to display or other output, and so forth.

To illustrate, user 111 may be using device 115 to access a data set in database 147. User 111 may not be authorized to access the data set. However, user 113 may be authorized to access the data set. In addition, user 113 may be training or assisting user 111. Accordingly, in one example, application server 145 may detect an interaction between user 111 and user 113. In one example, the interaction may be inferred by the proximity of users 111 and 113. In one example, the proximity of users 111 and 113 may be determined via the detection of mobile endpoint devices 110 and 112, respectively by wireless transceiver 194, by the detection of users 111 and 113 through biometric techniques, by the detection of identification badges 117 and 118, and so on. In one example, the interaction may be determined by detecting the proximity of users 111 and 113, and may be further verified by analysis. For example, the visual focus of a user's eyes, the user's heart rate, and other factors may be individually measured or quantified and correlated with measurements from the other user to determine that the two users are engaged in an interaction. For instance, if a result of an autocorrelation function based upon a number of such factors exceeds a predefined threshold, application server 145 may determine that the users are likely engaged in an interaction. In other examples, application server 145 may process such factors to determine whether or not user 111 and user 113 are engaged in an interaction based upon a mutual information based function, or the like. Alternatively, or in addition, a notification may be sent to mobile endpoint device 112 or other devices of the authorized user 113 to confirm or deny whether the two users are engaged in an interaction and that the other user 111 should be granted temporary access/authorization.

In another example, user 111 may be attempting to access a data set in database 147 via device 115, while user 113 may be logged into device 114 and engaged in a screen sharing session with device 115. In one example, the screen sharing session may be via AS 145, or AS 145 may poll one or more other devices in network 140 (not shown) to determine that devices 114 and 115 are engaged in a screen sharing session, and hence, logged in users 111 and 113 are presently engaged in an interaction. In such case, AS 145 may grant a temporary authorization for user 111 to access the data set in database 147. In one example, the privileges of the temporary authorization may the same as the privileges of user 113.

In still another example, user 113 may be authorized to access a data set in database 147 and may be attempting to do so via device 115. However, application server 145 may detect that device 115 is located at or near security unit 190 and/or access network 120, which may be in a known insecure location. Alternatively, or in addition, application server 145 may determine that device 115 is located in an insecure location based upon Global Positioning System (GPS) location information from device 115, using cell identifier (ID) based methods, observed time difference of arrival (OTDA) techniques, or barycentric triangulation, and so forth, where the location is designated as an insecure location, or is not a specific designated secure location. In still another example, application server 145 may determine that device 115 is in an insecure location when it is determined that at least one unknown user or known unauthorized user (e.g., user 111) is present in the same location.

In any case, application server 145 may determine that the authorization of user 113 should be temporarily revoked, e.g., until device 115 is in a secure location either by moving or by determining that one or more unauthorized individuals are no longer present, e.g., no longer physically proximate to device 115. Alternatively, or in addition application server 145 may permit the user 113 to access the data set in database 147, but may alter portions of the data set that may be provided to device 115, e.g., prior to device 115 displaying data/records responsive to a query or other actions. In another example, application server 145 may provide instructions to device 115 to alter portions of the data set prior to any display of the data and/or to alter portions of a user interface. For instance, in a managed organization, settings at a user desktop of device 115 may impose server-based restrictions from application server 145.

Thus, the system 100 provides an illustrative environment for providing, in response to detecting an interaction of a first user and a second user, a temporary authorization to the second user to access a data set based upon an authorization of the first user to access the data set, and for altering restricted data from a data set when it is detected that a user authorized to access the data set is requesting to view data from the data set at an insecure location, in accordance with the present disclosure.

It should be noted that the system 100 has been simplified. In other words, the system 100 may be implemented in a different form than that which is illustrated in FIG. 1. For example, the system 100 may be expanded to include other network elements (not shown) such as border elements, routers, switches, policy servers, security devices, gateways, a content distribution network (CDN) and the like, without altering the scope of the present disclosure. Similarly, system 100 may omit various elements, substitute elements for devices that perform the same or similar functions and/or combine elements that are illustrated as separate devices. For example, application server 145 and/or device 114 may comprise functions that are spread across several devices that operate collectively to perform the respective functions described above. For instance, application server 145 and/or device 114 may be deployed as a virtual machine operating on one or more physical host devices in a same location or distributed among several physical locations. In addition, although two access networks 120 and 130, two mobile endpoint devices 110 and 112, and devices 114 and 115 are illustrated in FIG. 1, it should be understood that any number of access networks and devices may connect to the network 140. Thus, these and other modifications of the system 100 are all contemplated within the scope of the present disclosure.

Figure 2:
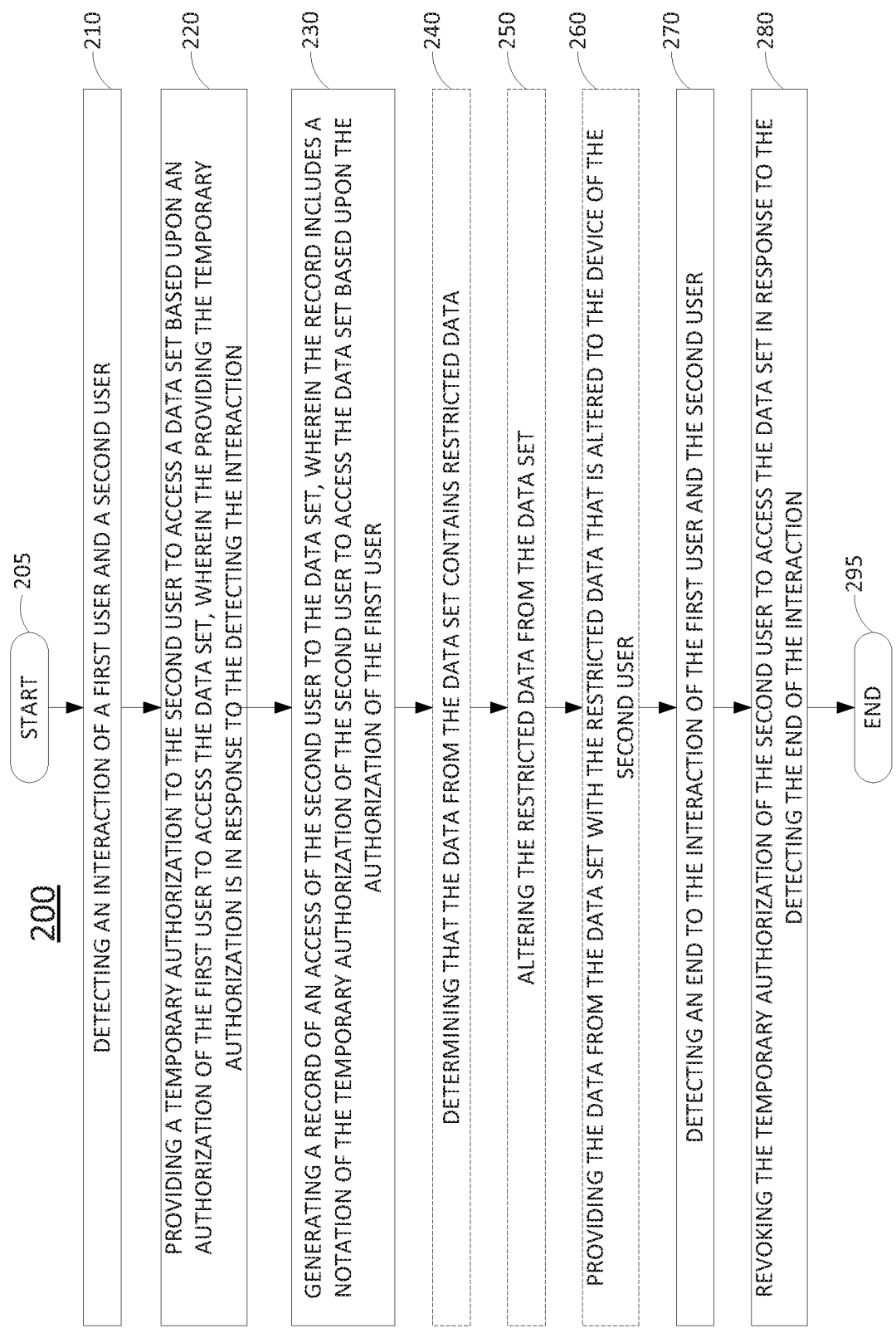
FIG. 2 illustrates a flowchart of an example method for providing, in response to detecting an interaction of a first user and a second user, a temporary authorization to the second user to access a data set based upon an authorization of the first user to access the data set, in accordance with the present disclosure.

FIG. 2 illustrates a flowchart of an example method 200 for providing, in response to detecting an interaction of a first user and a second user, a temporary authorization to the second user to access a data set based upon an authorization of the first user to access the data set, in accordance with the present disclosure. In one example, steps, functions and/or operations of the method 200 may be performed by a device as illustrated in FIG. 1, e.g., an application server or any one or more components thereof, such as a processing system, a mobile endpoint device or other user devices, and so forth. Alternatively, or in addition, the steps, functions and/or operations of the method 200 may be performed by a processing system comprising a plurality of devices as illustrated in FIG. 1, such as an application server, a security unit, and so forth. In one example, the steps, functions, or operations of method 200 may be performed by a computing device or system 400, and/or a processing system 402 as described in connection with FIG. 4 below. For instance, the computing device 400 may represent at least a portion of an application server, a security unit, and so forth, in accordance with the present disclosure. For illustrative purposes, the method 200 is described in greater detail below in connection with an example performed by a processing system, such as processing system 402. The method 200 begins in step 205 and proceeds to step 210.

At step 210, the processing system detects an interaction of a first user and a second user. In one example, the detecting the interaction of the first user and the second user comprises detecting a presence of the first user and the second user at a location, e.g., a geographic location. In one example, the presence of the first user and the second user at the location is detected via at least one of: a biometric detection of at least one of the first user or the second user at the location or a detection of a mobile endpoint device of at least one of the first user or the second user at the location, e.g., via RFID, Wi-Fi, Wi-Fi Direct, Bluetooth, and/or BLE communications, depending upon the device types and capabilities of the mobile endpoint device(s). In one example, at least one of the first user or the second user may be detected at the location when a badge or identification card of the first user or the second user is scanned at the location, e.g., in order to enter a room or an area. In one example, the second user may be detected at the location by virtue of the second user logging into a computer terminal that is known to be at the location or a user desktop running on the computer terminal at the location, or by the second user logging into a server or a server-based program via the computer terminal at the location. In one example, the detecting the interaction may further comprise obtaining a verification from the first user of the interaction of the first user and the second user. In one example, the presence of the second user is determined in response to a login of the second user at the device of the second user. In another example, the detecting the interaction of the first user and the second user comprises detecting an electronic collaboration session between a device of the first user and a device of the second user, e.g., a screen sharing session, a web conference, a tethering interaction between devices of the first and second users, and the like.

At step 220, the processing system provides, in response to the detecting the interaction, a temporary authorization to the second user to access a data set based upon an authorization of the first user to access the data set. In one example, the temporary authorization is provided in response to a request from the second user to access the data set and after determining that the first user and the second user are engaged in an interaction. For example, the second user may be using a program on a device of the second user for accessing the data set and may enter a command via the program that involves access to the data set. The processing system may receive the command and may then first determine that the second user is not authorized to access the data set. However, the processing system, having determined at step 210 that the first user and the second user are engaged in an interaction and that the first user is authorized to access the data set, may then provide the temporary authorization to the second user. In one example, the temporary authorization to the second user is concomitant with the authorization of the first user to access the data set. For instance, the second user may be permitted to execute certain commands but not others with respect to the data set, may be permitted to perform operations on a certain portion of the data set but to not view the portion of the data set, and so forth.

At step 230, the processing system generates a record of an access of the second user to the data set. In one example, the record includes a notation of the temporary authorization of the second user to access the data set based upon the authorization of the first user. For instance, in one example, for auditing purposes it may be beneficial to include additional records that attribute various actions to both the second user and the first user, who are presumed to be engaged in an interaction, e.g., a joint task with respect to the data set.

At optional step 240, the processor may determine that the data from the data set contains restricted data. In one example, the restricted data may include a designation of being "restricted" as stored in the data set. In another example, the restricted data may be determined based upon the context of the access to the data set. For instance, in one example, the access of the second user to the data set may comprise a query on the data set, and the restricted data may comprise information that is determined to be unrelated to the query. For instance, a query to search for customer accounts in a service area that may be experiencing a common outage or network degradation may return a list of relevant customer account records. The customer account records may include income information, creditworthiness information, and so forth. However, such information is not relevant to identifying customer equipment and locations that may be affected by a network service problem. As such, these sensitive fields may be identified as "restricted data." In one example, the temporary authorization may permit the second user to process and manipulate restricted data, but not to actually view the contents of the restricted data.

At optional step 250, the processor may alter the restricted data from the data set. For instance, the restricted data may be suppressed (e.g., hidden, redacted, or omitted), anonymized, obfuscated, replaced, substituted, etc. For instance, customer salary information, creditworthiness scores, and other restricted data may be replaced by dashes, stars, hash characters, or the like, replaced with random values, and so on.

At optional step 260, the processing system may provide the data from the data set with the restricted data that is altered to the device of the second user. For example, the access of the second user to the data set may comprise a query on the data set. In addition, in one example, the access of the second user to the data set may include a display of data from the data set via a device of the second user in response to the query. Accordingly, the restricted data may be altered such that although the restricted data may possibly be accessed, processed, manipulated, and so forth by the processing system, the restricted data may not actually be seen by the first user, the second user, or anyone else who may be present at or near the device of the second user that is being used to access the data set.

At step 270, the processing system detects an end to the interaction of the first user and the second user. In one example, the processing system detects the end to the interaction of the first user and the second user by detecting a presence of the first user at a different location. In another example, the processing system detects the end to the interaction of the first user and the second user by detecting a termination of a collaboration session. In still another example, the end of the interaction may be detected when the second user logs out of a device, desktop, program, or other systems that are used to access the data set.

At step 280, the processing system revokes the temporary authorization of the second user to access the data set in response to the detecting the end of the interaction. Following step 280, the method 200 proceeds to step 295. At step 295, the method 200 ends.

Figure 3:
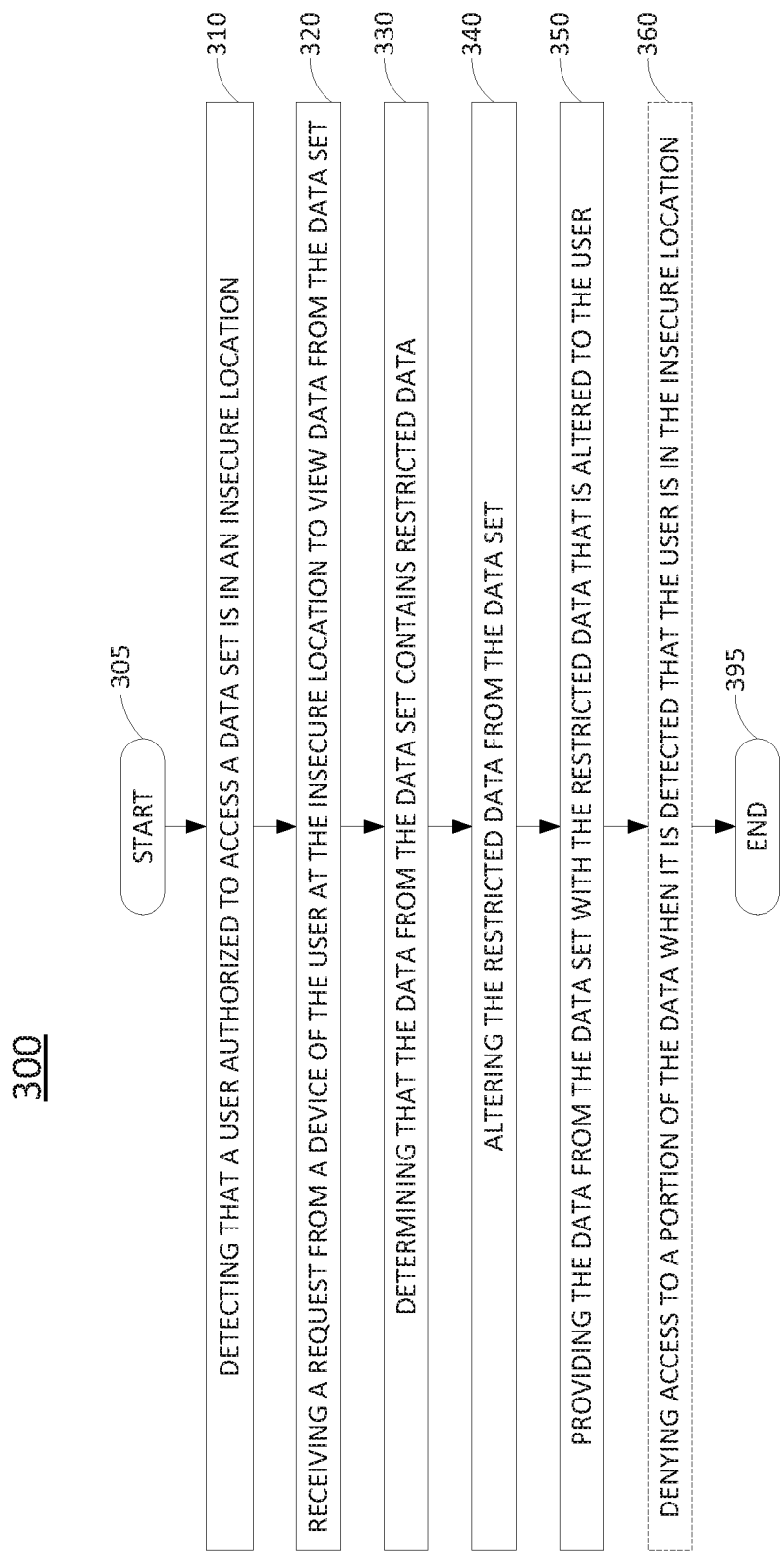
FIG. 3 illustrates a flowchart of an example method for altering restricted data from a data set when it is detected that a user authorized to access the data set is requesting to view data from the data set at an insecure location, in accordance with the present disclosure.

FIG. 3 illustrates a flowchart of an example method 300 for altering restricted data from a data set when it is detected that a user authorized to access the data set is requesting to view data from the data set at an insecure location, in accordance with the present disclosure. In one example, steps, functions and/or operations of the method 300 may be performed by a device as illustrated in FIG. 1, e.g., an application server or any one or more components thereof, such as a processing system, a mobile endpoint device or other user device, and so forth. Alternatively, or in addition, the steps, functions and/or operations of the method 300 may be performed by a processing system comprising a plurality of devices as illustrated in FIG. 1, such as an application server, a security unit, and so forth. In one example, the steps, functions, or operations of method 300 may be performed by a computing device or system 400, and/or a processing system 402 as described in connection with FIG. 4 below. For instance, the computing device 400 may represent at least a portion of an application server, a security unit, and so forth, in accordance with the present disclosure. For illustrative purposes, the method 300 is described in greater detail below in connection with an example performed by a processing system, such as processing system 402. The method 300 begins in step 305 and proceeds to step 310.

At step 310, the processing system detects that a user authorized to access a data set is in an insecure location. In one example, the user is detected to be at an insecure location when a device of the user is engaged in a screen sharing session with another device. It should be noted that the user may be engaged in a virtual meeting including one or more other authorized users. However, there may also be one or more other unauthorized users engaged in the virtual meeting through their respective devices which may cause the processing system to determine that the user authorized to access a data set is in an insecure location. In another example, the user is detected to be at an insecure location when the processing system determines that the user is in the presence of an unauthorized person. In one example, the user is determined to be in the presence of the unauthorized person based upon a biometric detection of the unauthorized person at the insecure location, a detection of an identification badge of the unauthorized person, or a detection of an unauthorized wireless device at the insecure location, e.g., via a barcode scanner, an RFID reader, a Bluetooth beacon, a Wi-Fi router, or the like.

At step 320, the processing system receives a request from a device of the user at the insecure location to view data from the data set. The request may comprise a query on the data set that will result in a display of data from the data set as an output. For instance, a query may seek data in the data set from a particular date and/or time range, data relating to a particular location or set of locations, data relating to a particular base station of a cellular network, data relating to a particular subnet of an Internet Protocol network, and so forth. The request may include operations on the data set that may include join operations, union operations, pivot operations, etc. where the data that is modified or otherwise processed via such operations may also be output for display at the device of the user.

At step 330, the processing system determines that the data from the data set contains restricted data. In one example, the restricted data may include a designation of being "restricted" as stored in the data set. In another example, the restricted data may be determined based upon the context of the access to the data set. In one example, step 330 may comprise the same or similar operations as described above in connection with optional step 240 of the method 200.

At step 340, the processing system alters the restricted data from the data set. For instance, the restricted data may be suppressed (e.g., hidden, redacted, or omitted), anonymized, obfuscated, replaced, substituted, etc. For instance, customer salary information, creditworthiness scores, and other restricted data may be replaced by dashes, stars, hash characters, or the like, replaced with random values, and so on. In one example, step 340 may comprise the same or similar operations as optional step 250 of the method 200.

At step 350, the processing system provides the data from the data set with the restricted data that is altered to the user. For example, the request to view the data from the data set may comprise a query on the data set. In addition, in one example, the processing of the query may result in a display of data from the data set via a device of the user in response to the query. Accordingly, the restricted data may be altered such that although the restricted data may possibly be accessed, processed, manipulated, and so forth by the processing system and/or the device of the user, the restricted data may not actually be seen by the user or anyone else who may be present at or near the device of the user. In one example, step 350 may comprise the same or similar operations as optional step 260 of the method 200.

At optional step 360, the processing system may deny access to a portion of the data when it is detected that the user is in the insecure location. For example, as a security measure, the processing system may impose a combination of denial of access to some data and alteration (e.g., obfuscation, anonymization, and/or redacting) of other data. For instance, some data may be designated for heightened restriction whereby the data having such a designation may be prevented from being modified, joined, searched, displayed, or otherwise processed, e.g., in addition to being prohibited from being provided for display.

Following step 350 or optional step 360, the method 300 proceeds to step 395. At step 395, the method 300 ends.

It should be noted that either of the methods 200 and 300 may be expanded to include additional steps or may be modified to include additional operations with respect to the steps outlined above. For example, the respective methods 200 and 300 may be repeated through various cycles of access and/or viewing of data from a data set. In one example, the operations of the method 300 may be dependent upon a threshold number of other users being detected at a same location the user is attempting to view the data at step 310. For instance, if only a single other user is detected, it may be assumed that the user may position the device so that the other user cannot see the screen. However, if dozens of other users are detected, e.g., at a corporate cafeteria, a conference room, a lecture hall, etc., it may be assumed that it is more likely another user may surreptitiously be able to view the data from the data set such that the data should be altered for display. Thus, these and other modifications are all contemplated within the scope of the present disclosure.

In addition, although not specifically specified, one or more steps, functions, or operations of the respective methods 200 and 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in either of FIGS. 2 and 3 that recite a determining operation or involve a decision do not necessarily require that both branches of the determining operation be practiced. In other words, one of the branches of the determining operation can be deemed as an optional step. In addition, steps, blocks, functions or operations of the above described method(s) can be combined, separated, and/or performed in a different order from that described above, without departing from the example examples of the present disclosure. Thus, these and other modification are all contemplated within the scope of the present disclosure.

Figure 4:
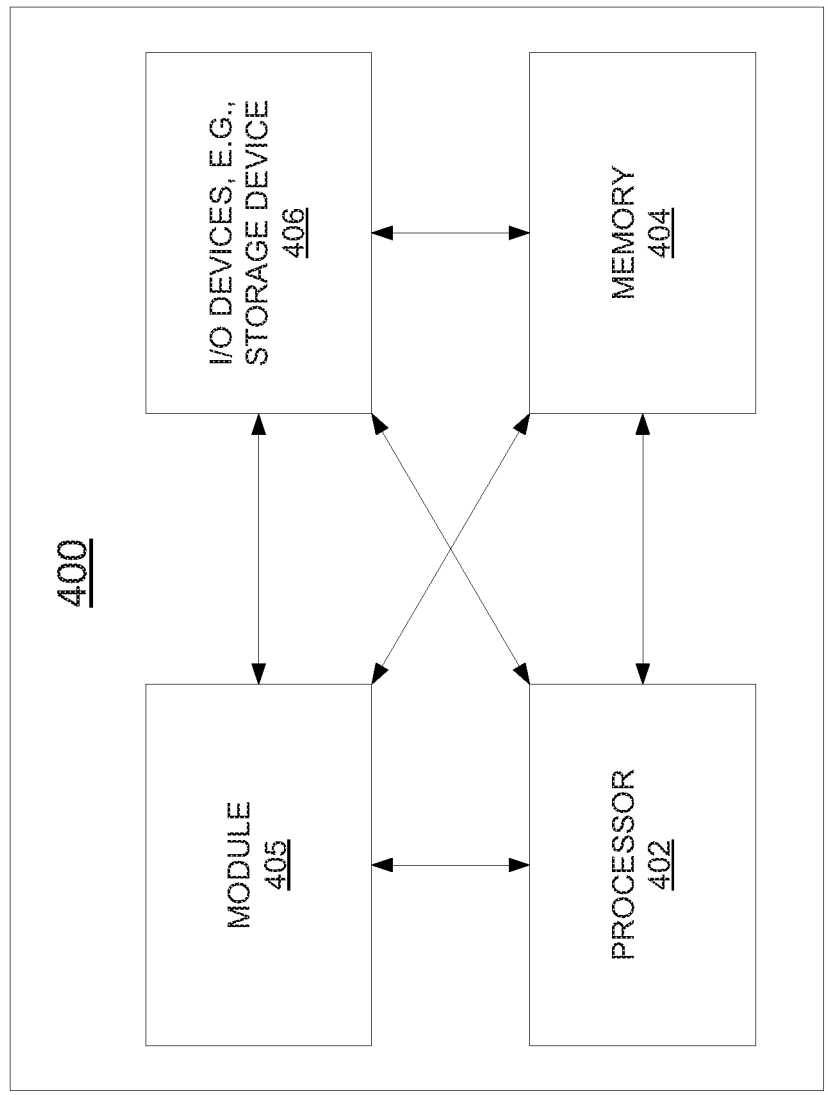
FIG. 4 illustrates an example high-level block diagram of a computer specifically programmed to perform the steps, functions, blocks, and/or operations described herein.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for providing, in response to detecting an interaction of a first user and a second user, a temporary authorization to the second user to access a data set based upon an authorization of the first user to access the data set and/or for altering restricted data from a data set when it is detected that a user authorized to access the data set is requesting to view data from the data set at an insecure location, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or method 300, or the entire method 200 or method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the methods discussed above can be used to configure a hardware processor to perform the steps, functions and/or operations of the above disclosed methods 200 and 300. In one example, instructions and data for the present module or process 405 for providing, in response to detecting an interaction of a first user and a second user, a temporary authorization to the second user to access a data set based upon an authorization of the first user to access the data set and/or for altering restricted data from a data set when it is detected that a user authorized to access the data set is requesting to view data from the data set at an insecure location (e.g., a software program comprising computer-executable instructions) can be loaded into memory 404 and executed by hardware processor element 402 to implement the steps, functions, or operations as discussed above in connection with the illustrative method 200 and/or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for providing, in response to detecting an interaction of a first user and a second user, a temporary authorization to the second user to access a data set based upon an authorization of the first user to access the data set and/or for altering restricted data from a data set when it is detected that a user authorized to access the data set is requesting to view data from the data set at an insecure location (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

detecting, by a server deployed in a communication network, the server including at least one processor, an interaction at a physical location between a first user at the physical location and a second user at the physical location, wherein the detecting the interaction at the physical location between the first user at the physical location and the second user at the physical location comprises detecting a presence of the first user and the second user at the physical location, wherein the presence of the first user at the physical location is detected via a detection of an identification badge of the first user at the physical location;

providing, by the server, a temporary authorization to the second user to access a data set stored in a database system via a device of the second user based upon an authorization level of the first user to access the data set, wherein the temporary authorization is provided by the server in response to the server detecting the interaction at the physical location, wherein the device of the second user is distinct from the server;

generating, by the server, a record of an access of the second user to the data set via the device of the second user, wherein the record includes a notation of the temporary authorization of the second user to access the data set based upon the authorization of the first user, wherein the access includes a database query via the device of the second user that results in a modification to the data set that is stored in the database system;

detecting, by the server, an end to the interaction at the physical location between the first user at the physical location and the second user at the physical location; and revoking, by the server, the temporary authorization of the second user to access the data set in response to the detecting of the end of the interaction at the physical location.

2. The method of claim 1, wherein the temporary authorization to the second user comprises at least a portion of privileges of the authorization level of the first user to access the data set.

3. The method of claim 1, wherein the access of the second user to the data set comprises a display of at least a portion of data from the data set via the device of the second user.

4. The method of claim 3, further comprising:
determining that the data from the data set contains restricted data;
altering the restricted data of the data from the data set; and
providing the restricted data that is altered to the device of the second user.

5. The method of claim 4, wherein the display of the at least a portion of the data from the data set via the device of the second user is in response to the database query.

6. The method of claim 5, wherein the restricted data comprises information that is unrelated to the database query.

7. The method of claim 1, wherein the presence of the second user at the physical location is detected via at least one of:
a biometric detection of the second user at the physical location;
a detection of a mobile endpoint device of the second user at the physical location; or
a detection of an identification badge of the second user at the physical location.

8. The method of claim 1, wherein the detecting the interaction at the physical location between the first user at the physical location and the second user at the physical location comprises:
obtaining a verification from the first user of the interaction at the physical location between the first user and the second user.

9. The method of claim 1, wherein the detecting the end to the interaction at the physical location between the first user at the physical location and the second user at the physical location comprises detecting a presence of the first user or the second user at a different physical location.

10. The method of claim 1, wherein the presence of the second user is determined in response to a login of the second user at the device of the second user.

11. The method of claim 1, wherein the detecting the interaction at the physical location between the first user at the physical location and the second user at the physical location comprises detecting a collaboration session between a device of the first user and the device of the second user.

12. The method of claim 11, wherein the detecting the end to the interaction at the physical location between the first user at the physical location and the second user at the physical location comprises detecting a termination of the collaboration session.

13. A server device comprising:
a processing system including at least one processor; and
a non-transitory computer-readable medium storing instructions which, when executed by the processing system when deployed in a communication network, cause the processing system to perform operations, the operations comprising:
detecting an interaction at a physical location between a first user at the physical location and a second user at the physical location, wherein the detecting the interaction at the physical location between the first user at the physical location and the second user at the physical location comprises detecting a presence of the first user and the second user at the physical location, wherein the presence of the first user at the physical location is detected via a detection of an identification badge of the first user at the physical location;
providing a temporary authorization to the second user to access a data set stored in a database system via a device of the second user based upon an authorization level of the first user to access the data set, wherein the temporary authorization is provided by the processing system in response to the processing system detecting the interaction at the physical location, wherein the device of the second user is distinct from the processing system;
generating a record of an access of the second user to the data set via the device of the second user, wherein the record includes a notation of the temporary authorization of the second user to access the data set based upon the authorization of the first user, wherein the access includes a database query via the device of the second user that results in a modification to the data set that is stored in the database system;
detecting an end to the interaction at the physical location between the first user at the physical location and the second user at the physical location; and
revoking the temporary authorization of the second user to access the data set in response to the detecting of the end of the interaction at the physical location.

14. The server device of claim 13, wherein the detecting the interaction at the physical location between the first user at the physical location and the second user at the physical location comprises detecting a collaboration session between a device of the first user and the device of the second user.

15. The server device of claim 14, wherein the detecting the end to the interaction at the physical location between the first user at the physical location and the second user at the physical location comprises detecting a termination of the collaboration session.

16. A method comprising:
detecting, by a server deployed in a communication network, the server including at least one processor, that a user authorized to access a data set stored in a database system is in an insecure location, wherein the detecting comprises determining that a device of the user is engaged in a screen sharing session with another device;
receiving, by the server, a request from the device of the user in the insecure location to view data from the data set, wherein the request comprises a database query;
determining, by the server, that the data from the data set contains restricted data;
altering, by the server, the restricted data of the data from the data set; and
providing, by the server, the restricted data that is altered to the device of the user, wherein the server is distinct from the device of the user and the another device, wherein the server is located remote from the device of the user and the another device, wherein the determining, the altering, and the providing are performed in response to the receiving the request from the device of the user that is engaged in the screen sharing session to view the data from the data set.

17. The method of claim 16, wherein the detecting that the user is in the insecure location further comprises:
determining that the user is in the presence of an unauthorized person.

18. The method of claim 17, wherein the determining that the user is in the presence of the unauthorized person is based upon:
a biometric detection of the unauthorized person in the insecure location;
a detection of an identification badge of the unauthorized person in the insecure location; or
a detection of an unauthorized wireless device in the insecure location.

19. The method of claim 16, wherein the altering the restricted data comprises at least one of:
obfuscating the restricted data;
anonymizing the restricted data; or
redacting the restricted data.

20. The method of claim 16, further comprising:
denying access to a portion of the data when it is detected that the user is in the insecure location.

* * * * *